United States Patent
Eoff et al.

(10) Patent No.: US 8,008,235 B2
(45) Date of Patent: *Aug. 30, 2011

(54) PERMEABILITY-MODIFYING DRILLING FLUIDS AND METHODS OF USE

(75) Inventors: Larry S. Eoff, Duncan, OK (US); Eldon D. Dalrymple, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/806,894

(22) Filed: Mar. 23, 2004

(65) Prior Publication Data

US 2005/0155796 A1    Jul. 21, 2005

Related U.S. Application Data

(63) Continuation-in-part of application No. 10/760,443, filed on Jan. 20, 2004, now Pat. No. 7,759,292.

(51) Int. Cl.
*C09K 8/588* (2006.01)
*C09K 8/88* (2006.01)
*C09K 8/90* (2006.01)

(52) U.S. Cl. ........ 507/214; 507/212; 507/219; 507/244; 507/246; 507/255; 507/259; 507/260; 507/261; 507/267; 166/305.1; 166/306

(58) Field of Classification Search .................. None
See application file for complete search history.

(56) References Cited

U.S. PATENT DOCUMENTS

| | | | |
|---|---|---|---|
| 2,278,838 A | * | 4/1942 | Keiser et. al. ............... 507/261 |
| 2,670,329 A | * | 2/1954 | Jones, V ..................... 507/113 |
| 2,687,375 A | | 8/1954 | Fischer et al. |
| 2,689,244 A | * | 9/1954 | Jones, V ........................ 536/20 |
| 2,819,278 A | | 1/1958 | De Groots et al. |
| 2,843,573 A | | 7/1958 | Melamed ..................... 526/260 |
| 2,863,832 A | | 12/1958 | Perrine ......................... 507/267 |
| 2,877,179 A | | 3/1959 | Hughes et al. |
| 2,910,436 A | | 10/1959 | Alhambra et al. ............. 166/307 |
| 3,008,898 A | | 11/1961 | Hughes et al. |
| 3,052,298 A | | 9/1962 | Mallot |
| 3,065,247 A | | 11/1962 | De Groots et al. |
| 3,138,205 A | | 6/1964 | Kerver et al. |
| 3,215,199 A | | 11/1965 | Dilgren ..................... 166/250.01 |
| 3,251,415 A | | 5/1966 | Bombardier et al. ........... 166/42 |
| 3,251,778 A | | 5/1966 | Dickson ......................... 252/82 |
| 3,258,428 A | | 6/1966 | Dickson ....................... 252/180 |
| 3,265,512 A | | 8/1966 | Dickson ......................... 106/14 |
| 3,271,307 A | * | 9/1966 | Dickson et al. ............. 166/280.1 |
| 3,297,090 A | | 1/1967 | Dilgren ......................... 166/300 |
| 3,307,630 A | | 3/1967 | Dilgren et al. .................. 166/38 |
| 3,326,890 A | | 6/1967 | Engelskirchen et al. |
| 3,336,980 A | | 8/1967 | Rike |
| 3,347,789 A | | 10/1967 | Dickson ........................ 252/9.55 |
| 3,382,924 A | | 5/1968 | Veley et al. ..................... 166/42 |
| 3,404,114 A | | 10/1968 | Walter et al. ................... 524/812 |
| 3,434,971 A | | 3/1969 | Atkins ........................ 252/8.55 |
| 3,441,085 A | | 4/1969 | Gidley .......................... 166/307 |
| 3,451,818 A | | 6/1969 | Wareham ......................... 96/78 |
| 3,489,222 A | | 1/1970 | Millhone et al. |
| 3,601,194 A | | 8/1971 | Gallus .......................... 166/283 |
| 3,615,794 A | | 10/1971 | Nimerick |
| 3,637,656 A | | 1/1972 | Germino et al. |
| 3,647,507 A | | 3/1972 | Ashcraft ........................ 427/288 |
| 3,647,567 A | | 3/1972 | Schweri et al. ............... 428/463 |
| 3,689,418 A | | 9/1972 | Cenci et al. |
| 3,689,468 A | | 9/1972 | Cenci et al. .................... 526/312 |
| 3,708,013 A | | 1/1973 | Dismukes |
| 3,709,298 A | | 1/1973 | Pramann |
| 3,744,566 A | | 7/1973 | Szabo et al. ................... 166/275 |
| 3,818,991 A | | 6/1974 | Nimerick |
| 3,902,557 A | | 9/1975 | Shaughnessy et al. |
| 3,910,862 A | | 10/1975 | Barabas et al. ...... 260/79.3 MU |
| 3,943,060 A | | 3/1976 | Martin et al. |
| 3,983,941 A | | 10/1976 | Fitch |
| 4,029,544 A | | 6/1977 | Jarowenko et al. |
| 4,052,343 A | | 10/1977 | Cunningham ................... 521/32 |
| 4,052,345 A | | 10/1977 | Austin et al. ................... 521/129 |

(Continued)

FOREIGN PATENT DOCUMENTS

DE    2 250 552    4/1974

(Continued)

OTHER PUBLICATIONS

U.S. Appl. No. 10/236,722, filed Sep. 6, 2002, Eoff et al.

(Continued)

*Primary Examiner* — John J Figueroa
(74) *Attorney, Agent, or Firm* — Robert A. Kent; McDermott Will & Emery LLP

(57) ABSTRACT

The present invention provides drilling fluids that comprise a base fluid and a water-soluble relative permeability modifier. In addition, the present invention provides methods of reducing the permeability of a subterranean formation to aqueous-based fluids during the drilling phase that comprises providing a water-soluble relative permeability modifier; and placing the water-soluble relative permeability modifier into the subterranean formation during the drilling phase. The present invention provides methods of drilling a well bore in a subterranean formation comprising providing a drilling fluid that comprises a base fluid and a water-soluble relative permeability modifier, and placing the drilling fluid in the subterranean formation. The water-soluble relative permeability modifiers of the present invention generally may comprise hydrophilically modified polymers, hydrophobically modified polymers, or water-soluble polymers without hydrophobic or hydrophilic modification.

5 Claims, No Drawings

U.S. PATENT DOCUMENTS

| | | | | |
|---|---|---|---|---|
| 4,129,183 | A | 12/1978 | Kalfoglou | 166/300 |
| 4,129,534 | A | 12/1978 | Cunningham | 521/38 |
| 4,142,595 | A | 3/1979 | Anderson et al. | 175/72 |
| 4,152,274 | A | 5/1979 | Phillips et al. | 876/296 |
| 4,158,521 | A | 6/1979 | Anderson et al. | 405/264 |
| 4,158,726 | A | 6/1979 | Kamada et al. | 526/200 |
| 4,228,277 | A | 10/1980 | Landoll | |
| 4,299,710 | A | 11/1981 | Dupre et al. | 252/8.5 A |
| 4,306,981 | A * | 12/1981 | Blair, Jr. | 507/220 |
| 4,337,828 | A * | 7/1982 | Blair, Jr. | 166/400 |
| 4,366,071 | A | 12/1982 | McLaughlin et al. | 252/8.55 R |
| 4,366,072 | A | 12/1982 | McLaughlin et al. | 252/8.55 R |
| 4,366,073 | A | 12/1982 | McLaughlin et al. | 252/8.55 R |
| 4,366,074 | A | 12/1982 | McLaughlin et al. | 252/8.55 R |
| 4,374,739 | A | 2/1983 | McLaughlin et al. | 252/8.55 R |
| 4,393,939 | A | 7/1983 | Smith et al. | 166/293 |
| 4,395,340 | A | 7/1983 | McLaughlin | 252/8.55 D |
| 4,401,789 | A | 8/1983 | Gideon | 524/827 |
| 4,409,110 | A | 10/1983 | Borchardt et al. | |
| 4,439,334 | A | 3/1984 | Borchardt | 252/8.55 D |
| 4,440,649 | A | 4/1984 | Loftin et al. | 252/8.5 C |
| 4,441,556 | A | 4/1984 | Powers et al. | |
| 4,447,342 | A | 5/1984 | Borchardt et al. | 252/8.55 D |
| 4,460,627 | A | 7/1984 | Weaver et al. | 427/212 |
| 4,462,718 | A | 7/1984 | McLaughlin et al. | 405/264 |
| 4,499,214 | A | 2/1985 | Sortwell | |
| 4,532,052 | A | 7/1985 | Weaver et al. | 252/8.55 R |
| 4,536,297 | A | 8/1985 | Loftin et al. | 252/8.5 C |
| 4,536,303 | A | 8/1985 | Borchardt | 252/8.55 R |
| 4,536,305 | A | 8/1985 | Borchardt et al. | 252/8.55 R |
| 4,552,670 | A | 11/1985 | Lipowski et al. | 704/553 |
| 4,554,081 | A | 11/1985 | Borchardt et al. | 252/8.5 A |
| 4,563,292 | A | 1/1986 | Borchardt | 252/8.55 R |
| 4,604,216 | A | 8/1986 | Irvin et al. | 252/8.51 |
| 4,608,139 | A | 8/1986 | Craun et al. | 428/457 |
| 4,619,776 | A | 10/1986 | Mondshine | |
| 4,627,926 | A | 12/1986 | Peiffer et al. | 252/8.55 R |
| 4,631,138 | A | 12/1986 | Johns et al. | |
| 4,662,448 | A | 5/1987 | Ashford et al. | |
| 4,671,883 | A | 6/1987 | Connell | 252/8.515 |
| 4,693,639 | A | 9/1987 | Hollenbeak et al. | 405/263 |
| 4,699,722 | A | 10/1987 | Dymond et al. | 252/8.551 |
| 4,702,319 | A | 10/1987 | Bock et al. | |
| 4,730,028 | A | 3/1988 | Bock et al. | 526/225 |
| 4,814,096 | A * | 3/1989 | Evani | 507/224 |
| 4,828,725 | A | 5/1989 | Lai et al. | |
| 4,828,726 | A | 5/1989 | Himes et al. | 252/8.553 |
| 4,856,590 | A | 8/1989 | Caillier | |
| 4,870,167 | A | 9/1989 | Zody et al. | |
| 4,941,537 | A | 7/1990 | Langemeier et al. | |
| 4,956,104 | A * | 9/1990 | Cowan et al. | 507/211 |
| 4,959,432 | A | 9/1990 | Fan et al. | 526/287 |
| 4,960,876 | A | 10/1990 | Molteni et al. | |
| 4,993,448 | A | 2/1991 | Karydas et al. | |
| 5,051,197 | A | 9/1991 | Kalfayan et al. | |
| 5,071,934 | A | 12/1991 | Peiffer | 526/307 |
| 5,097,904 | A | 3/1992 | Himes | 166/294 |
| 5,105,886 | A | 4/1992 | Strubhar et al. | |
| 5,146,986 | A | 9/1992 | Dalrymple | 166/294 |
| 5,160,642 | A | 11/1992 | Schield et al. | 252/8.551 |
| 5,197,544 | A | 3/1993 | Himes | 166/294 |
| 5,208,216 | A | 5/1993 | Williamson et al. | 507/120 |
| 5,244,042 | A | 9/1993 | Dovan et al. | 166/270 |
| 5,248,665 | A * | 9/1993 | Hale et al. | 507/136 |
| 5,256,651 | A | 10/1993 | Phelps et al. | |
| 5,271,466 | A | 12/1993 | Harms | 166/300 |
| 5,342,530 | A | 8/1994 | Aften et al. | 252/8.551 |
| 5,379,841 | A | 1/1995 | Pusch et al. | 166/295 |
| 5,382,371 | A | 1/1995 | Stahl et al. | 507/221 |
| 5,407,909 | A | 4/1995 | Goodhue, Jr. et al. | |
| 5,424,284 | A | 6/1995 | Patel et al. | |
| 5,445,223 | A | 8/1995 | Nelson et al. | |
| 5,473,059 | A * | 12/1995 | Yeh | 536/18.7 |
| 5,482,116 | A | 1/1996 | El-Rabaa et al. | |
| 5,566,760 | A | 10/1996 | Harris | |
| 5,597,783 | A | 1/1997 | Audibert et al. | 507/120 |
| 5,607,902 | A | 3/1997 | Smith et al. | 507/120 |
| 5,637,556 | A | 6/1997 | Argillier et al. | 507/120 |
| 5,643,460 | A | 7/1997 | Marble et al. | |
| 5,646,093 | A | 7/1997 | Dino | 507/209 |
| 5,663,123 | A | 9/1997 | Goodhue, Jr. et al. | |
| 5,669,456 | A | 9/1997 | Audibert et al. | 175/72 |
| 5,681,796 | A | 10/1997 | Nimerick | |
| 5,704,426 | A | 1/1998 | Rytlewski et al. | |
| 5,720,347 | A | 2/1998 | Audibert et al. | 166/294 |
| 5,728,653 | A | 3/1998 | Audibert et al. | 507/222 |
| 5,735,349 | A | 4/1998 | Dawson et al. | 166/295 |
| 5,887,653 | A | 3/1999 | Bishop et al. | 166/281 |
| 5,908,814 | A | 6/1999 | Patel et al. | |
| 5,944,106 | A | 8/1999 | Dalrymple et al. | 166/281 |
| 5,972,848 | A * | 10/1999 | Audibert et al. | 507/119 |
| 5,979,557 | A | 11/1999 | Card et al. | 166/300 |
| 5,990,052 | A | 11/1999 | Harris | |
| 6,020,289 | A | 2/2000 | Dymond | 507/120 |
| 6,047,773 | A | 4/2000 | Zeltmann et al. | |
| 6,070,664 | A | 6/2000 | Dalrymple et al. | 166/281 |
| 6,124,245 | A | 9/2000 | Patel | 507/120 |
| 6,162,766 | A | 12/2000 | Muir et al. | |
| 6,187,839 | B1 | 2/2001 | Eoff et al. | 523/130 |
| 6,194,356 | B1 * | 2/2001 | Jones et al. | 507/225 |
| 6,209,646 | B1 | 4/2001 | Reddy et al. | |
| 6,228,812 | B1 | 5/2001 | Dawson et al. | 507/221 |
| 6,237,687 | B1 | 5/2001 | Barbee, Jr. et al. | 166/278 |
| 6,242,390 | B1 | 6/2001 | Mitchell et al. | |
| 6,248,697 | B1 | 6/2001 | Goodhue, Jr. et al. | |
| 6,253,851 | B1 | 7/2001 | Schroeder, Jr. et al. | 166/278 |
| 6,277,900 | B1 | 8/2001 | Oswald et al. | 523/130 |
| 6,281,172 | B1 | 8/2001 | Warren et al. | |
| 6,283,210 | B1 | 9/2001 | Soliman et al. | 166/270 |
| 6,291,404 | B2 * | 9/2001 | House | 507/110 |
| 6,358,889 | B2 * | 3/2002 | Waggenspack et al. | 507/110 |
| 6,359,047 | B1 | 3/2002 | Thieu et al. | 524/376 |
| 6,364,016 | B1 | 4/2002 | Dalrymple et al. | 166/270 |
| 6,380,137 | B1 | 4/2002 | Heier et al. | 507/121 |
| 6,454,003 | B1 | 9/2002 | Chang et al. | |
| 6,476,169 | B1 | 11/2002 | Eoff et al. | 523/307.2 |
| 6,476,283 | B1 | 11/2002 | Devore et al. | 585/250 |
| 6,497,283 | B1 * | 12/2002 | Eoff et al. | 166/293 |
| 6,516,885 | B1 | 2/2003 | Munday | 166/295 |
| 6,520,255 | B2 | 2/2003 | Tolman et al. | |
| 6,562,762 | B2 * | 5/2003 | Cowan et al. | 536/20 |
| 6,569,983 | B1 | 5/2003 | Treybig et al. | 528/102 |
| 6,601,648 | B2 | 8/2003 | Ebinger | |
| 6,605,570 | B2 | 8/2003 | Miller et al. | |
| 6,607,035 | B1 | 8/2003 | Reddy et al. | |
| 6,609,578 | B2 | 8/2003 | Patel et al. | 175/64 |
| 6,626,241 | B2 | 9/2003 | Nguyen | |
| 6,627,719 | B2 | 9/2003 | Whipple et al. | 774/325 |
| 6,637,517 | B2 | 10/2003 | Samuel et al. | |
| 6,656,885 | B2 | 12/2003 | House et al. | |
| 6,662,874 | B2 | 12/2003 | Surjaatmadja et al. | |
| 6,702,044 | B2 | 3/2004 | Reddy et al. | |
| 6,710,107 | B2 | 3/2004 | Audibert et al. | 524/5 |
| 6,723,683 | B2 | 4/2004 | Crossman et al. | |
| 6,743,288 | B2 | 6/2004 | Eoff et al. | 106/724 |
| 6,756,345 | B2 | 6/2004 | Pakulski et al. | |
| 6,764,981 | B1 | 7/2004 | Eoff et al. | |
| 6,767,867 | B2 * | 7/2004 | Chatterji et al. | 507/216 |
| 6,767,869 | B2 | 7/2004 | DiLullo et al. | |
| 6,780,822 | B2 | 8/2004 | Cowan et al. | |
| 6,787,506 | B2 | 9/2004 | Blair et al. | 507/222 |
| 6,790,812 | B2 * | 9/2004 | Halliday et al. | 507/269 |
| 6,800,593 | B2 | 10/2004 | Dobson, Jr. et al. | |
| 6,803,348 | B2 | 10/2004 | Jones et al. | 507/221 |
| 6,846,420 | B2 | 1/2005 | Reddy et al. | |
| 6,855,672 | B2 | 2/2005 | Poelker | 507/225 |
| 6,872,820 | B2 * | 3/2005 | Weber et al. | 536/84 |
| 6,884,760 | B1 * | 4/2005 | Brand et al. | 507/140 |
| 6,913,081 | B2 | 7/2005 | Powell et al. | 166/279 |
| 6,933,381 | B2 | 8/2005 | Mallon et al. | |
| 6,962,203 | B2 | 11/2005 | Funchess | |
| 6,978,836 | B2 | 12/2005 | Nguyen et al. | |
| 6,981,552 | B2 | 1/2006 | Reddy et al. | |
| 7,007,752 | B2 | 3/2006 | Reddy et al. | |
| 7,008,908 | B2 | 3/2006 | Chan et al. | |
| 7,036,587 | B2 | 5/2006 | Munoz, Jr. et al. | |
| 7,036,589 | B2 | 5/2006 | Nguyen | |

| | | | |
|---|---|---|---|
| 7,081,439 B2 * | 7/2006 | Sullivan et al. | 507/269 |
| 7,087,554 B2 | 8/2006 | Youngson et al. | |
| 7,091,159 B2 * | 8/2006 | Eoff et al. | 507/120 |
| 7,117,942 B2 | 10/2006 | Dalrymple et al. | |
| 7,159,656 B2 | 1/2007 | Eoff et al. | |
| 7,178,610 B2 | 2/2007 | Bell | |
| 7,182,136 B2 | 2/2007 | Dalrymple et al. | |
| 7,220,708 B2 | 5/2007 | Zamora et al. | |
| 7,398,825 B2 | 7/2008 | Nguyen et al. | |
| 7,427,583 B2 | 9/2008 | Couillet et al. | |
| 7,759,292 B2 | 7/2010 | Eoff et al. | |
| 2002/0123433 A1 | 9/2002 | Goodhue, Jr. et al. | |
| 2003/0013871 A1 * | 1/2003 | Mallon et al. | 536/84 |
| 2003/0019627 A1 | 1/2003 | Qu et al. | 166/281 |
| 2003/0114317 A1 | 6/2003 | Benton et al. | |
| 2003/0139298 A1 | 7/2003 | Fu et al. | |
| 2004/0045712 A1 | 3/2004 | Eoff et al. | 166/293 |
| 2004/0102331 A1 | 5/2004 | Chan et al. | 507/100 |
| 2004/0171495 A1 | 9/2004 | Zamora et al. | 507/100 |
| 2004/0209780 A1 | 10/2004 | Harris et al. | |
| 2004/0220058 A1 | 11/2004 | Eoff et al. | 507/200 |
| 2004/0229756 A1 | 11/2004 | Eoff et al. | 507/219 |
| 2004/0229757 A1 | 11/2004 | Eoff et al. | 507/219 |
| 2005/0000694 A1 | 1/2005 | Dalrymple et al. | 166/307 |
| 2005/0194140 A1 | 9/2005 | Dalrymple et al. | |
| 2006/0016596 A1 | 1/2006 | Pauls et al. | |
| 2006/0124309 A1 | 6/2006 | Nguyen et al. | |
| 2006/0137875 A1 | 6/2006 | Dusterhoft et al. | |
| 2006/0234874 A1 | 10/2006 | Eoff et al. | |
| 2006/0240994 A1 | 10/2006 | Eoff et al. | |
| 2006/0266522 A1 | 11/2006 | Eoff et al. | |
| 2006/0283592 A1 | 12/2006 | Sierra et al. | |
| 2007/0012445 A1 | 1/2007 | Nguyen et al. | |
| 2008/0070805 A1 | 3/2008 | Munoz et al. | |
| 2008/0070807 A1 | 3/2008 | Munoz et al. | |
| 2008/0070808 A1 | 3/2008 | Munoz et al. | |
| 2008/0110624 A1 | 5/2008 | Nguyen et al. | |
| 2008/0139411 A1 | 6/2008 | Harris et al. | |
| 2008/0173448 A1 | 7/2008 | Nguyen et al. | |
| 2008/0196897 A1 | 8/2008 | Nguyen | |
| 2009/0291863 A1 | 11/2009 | Welton | |
| 2010/0276152 A1 | 11/2010 | De Wolf et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 99/49183 | 9/1999 |
| WO | WO 99/50530 | 10/1999 |
| WO | WO 00/78890 | 12/2000 |
| WO | WO 02/097236 A1 | 12/2002 |
| WO | WO 03/056130 | 7/2003 |
| WO | WO 2004/022667 A1 | 7/2003 |
| WO | WO 04/101706 A1 | 11/2004 |
| WO | WO 2004/094781 | 11/2004 |

OTHER PUBLICATIONS

U.S. Appl. No. 10/375,787, filed Feb. 27, 2003, Eoff et al.
U.S. Appl. No. 10/763,800, filed Jan. 24, 2004, Eoff et al.
Inikori, Solomon Ovueferaye, "Numerical Study of Water Coning Control with Downhole Water Sink (DWS) Well Completions in Vertical and Horizontal Wells," A Dissertation, Aug. 2002, title page, contents, abstract and pp. 17-18, The Department of Petroleum Engineering.
Halliburton, 2001 Press Release, "First Halliburton H2Zero™ Conformance Solution Job Performed for a Producing Well in Egypt," www.halliburton.com/news/archives/2001esgnws_111901.jsp, Nov. 19, 2001, 2 pp.
Halliburton, 2001 Press Release, "Halliburton Performs First H2Zero™ Conformance Solution Job in North America," www.halliburton.com/news/archives/2001_esgnws_082201.jsp, Aug. 22, 2001, 2 pp.
Halliburton, 2001 Press Release, "Halliburton Technology Uses Revolutionary Polymer system to Control Unwanted Water Production," www.halliburton.com/news/archives/2001esgnws_053101.jsp, May 31, 2001 2 pp.
BJ Services Company, Aquacon, Aug. 1, 2001, 2 pp.
BJ Services Company, Aquatrol 1, Dec. 14, 2000, 2 pp.
Eoff, Larry et al., "Structure and Process Optimization for the Use of a Polymeric Relative-Permeability Modifier in Conformance Control," SPE eLibrary paper No. 64985, 2001 Copyright, 2 pp.
Botermans, C. Wouter et al. "Relative Permeability Modifiers: Myth or Reality?" SPE eLibrary paper No. 68973, 2001 copyright, 2 pp.
U.S. Appl. No. 10/763,800, filed Jan. 18, 2004, Eoff, et al.
U.S. Appl. No. 10/780,995, filed Feb. 18, 2004, Eoff et al.
Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.
Botermans, C. Wouter, et al, *Relative Permeability Modifiers: Myth or Reality?*, SPE No. 68973, 2001, Society Petroleum Engineers, Inc., SPE European Formation Damage Conference, The Hague, The Netherlands, May 21-22, pp. 1-13.
Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14.
U.S. Appl. No. 10/825,001, filed Apr. 15, 2004, Eoff, et al.
U.S. Appl. No. 10/872,997, filed Jun. 21, 2004, Eoff, et al.
U.S. Appl. No. 10/881,198, filed Jun. 29, 2004, Dalrymple, et al.
U.S. Appl. No. 10/893,210, filed Jul. 16, 2004, Eoff, et al.
U.S. Appl. No. 11/102,062, filed Apr. 8, 2005, Sierra, et al.
U.S. Appl. No. 11/183,028, filed Jul. 15, 2005, Nguyen et al.
Xu, et al.., Modeling of Laser Spallation Drilling of Rocks for Gas- and Oilwell Drilling, SPE 95746, 2005.
Gahan, et al., Effect of Downhole Pressure Conditions on High-Power Laser Perforation, SPE 97093, 2005.
Gahan, et al., Analysis of Efficient High-Power Fiber Lasers of Well Perforation, SPE 90661, 2004.
Parker, et al., Well Perforation Using High-Power Lasers, SPE 84418, 2003.
Parker, et al., Laser Drilling: Effects of Beam Application Methods on Improving Rock Removal, SPE 84353, 2003.
Bai, et al., Improved Determination of Stree-Dependent Permeability for Anisotropic Formations, SPE 78188, 2002.
Proett, et al., Advanced Permeability and Anisotropy Measurements While Testing and Sampling in Real-Time Using a Dual Probe Formation Tester, SPE 62919, 2000.
Proett, et al., Advanced Dual Probe Formation Tester With Transient, Harmonic, and Pulsed Time-Delay Testing Methods Permeability, Skin and Anisotropy, SPE 64650, 2000.
Office Action dated Feb. 1, 2008 from U.S. Appl. No. 10/440,337.
Office Action dated May 22, 2008 from U.S. Appl. No. 11/102,062.
U.S. Appl. No. 12/080,647, filed Apr. 4, 2008.
Office action dated Nov. 16, 2007 from U.S. Appl. No. 10/760,443.
Office action dated Aug. 8, 2007 from U.S. Appl. No. 10/760,443.
Office action dated Feb. 21, 2007 from U.S. Appl. No. 10/760,443.
Office action dated Oct. 6, 2006 from U.S. Appl. No. 10/760,443.
Office action dated Mar. 23, 2006 from U.S. Appl. No. 10/760,443.
Notice of allowance dated Jan. 28, 2008 from U.S. Appl. No. 11/102,062.
Office action dated Jun. 27, 2007 from U.S. Appl. No. 11/102,062.
Office action dated May 1, 2007 from U.S. Appl. No. 11/122,836.
Office action dated Nov. 14, 2007 from U.S. Appl. No. 11/122,836.
Office action dated Feb. 1, 2008 from U.S. Appl. No. 10/440,337.
Office action dated Nov. 15, 2006 from U.S. Appl. No. 10/440,337.
Office action dated May 3, 2006 from U.S. Appl. No. 10/440,337.
Notice of allowance dated Mar. 23, 2006 from U.S. Appl. No. 10/236,722.
Office action dated Sep. 28, 2005 from U.S. Appl. No. 10/236,722.
Office action dated Jul. 5, 2005 from U.S. Appl. No. 10/236,722.
Office action dated Apr. 19, 2005 from U.S. Appl. No. 10/236,722.
Office action dated Oct. 20, 2004 from U.S. Appl. No. 10/236,722.
Notice of allowance dated Mar. 23, 2006 from U.S. Appl. No. 10/612,271.

Notice of allowance dated Jul. 18, 2006 from U.S. Appl. No. 10/825,001.
Office action dated Jan. 6, 2006 from U.S. Appl. No. 10/825,001.
Notice of allowance dated Aug. 17, 2006 from U.S. Appl. No. 10/881,198.
Notice of allowance dated May 25, 2006 from U.S. Appl. No. 10/881,198.
Notice of allowance dated Mar. 5, 2007 from U.S. Appl. No. 10/893,210.
Notice of allowance dated Feb. 27, 2007 from U.S. Appl. No. 10/893,210.
Office action dated Sep. 12, 2006 from U.S. Appl. No. 10/893,210.
Office action dated Jan. 14, 2008 from U.S. Appl. No. 11/471,148.
Office action dated Nov. 2, 2007 from U.S. Appl. No. 11/471,148.
Office action dated Sep. 20, 2007 from U.S. Appl. No. 11/471,148.
Office action dated Apr. 5, 2007 from U.S. Appl. No. 11/471,148.
Office action dated Jan. 14, 2008 from U.S. Appl. No. 11/471,738.
Office action dated Nov. 2, 2007 from U.S. Appl. No. 11/471,738.
Office action dated Sep. 20, 2007 from U.S. Appl. No. 11/471,738.
Office action dated Apr. 6, 2007 from U.S. Appl. No. 11/471,738.
Office action dated Sep. 24, 2007 from U.S. Appl. No. 10/862,132.
Office action dated Jul. 12, 2007 from U.S. Appl. No. 10/862,132.
Office action dated Jan. 22, 2007 from U.S. Appl. No. 10/862,132.
Office action dated Jul. 28, 2006 from U.S. Appl. No. 10/862,132.
Office Action dated Mar. 26, 2008 from U.S. Appl. No. 10/862,132.
Office Action dated Mar. 26, 2008 from U.S. Appl. No. 11/360,215.
Office Action dated Apr. 3, 2008 from U.S. Appl. No. 10/760,443.
Office Action from U.S. Appl. No. 11/485,199 mailed Sep. 24, 2008.
Office Action from U.S. Appl. No. 10/440,337 mailed Sep. 25, 2008.
Office Action from U.S. Appl. No. 11/102,062 mailed Sep. 23, 2008.
Office Action from U.S. Appl. No. 11/501,595 mailed Sep. 24, 2008.
Office Action mailed Oct. 31, 2008, for U.S. Appl. No. 10/862,132.
Office Action for U.S. Appl. No. 10/760,443, dated Dec. 23, 2008.
Office Action for U.S. Appl. No. 11/360,215 dated Sep. 17, 2008.
Office Action for U.S. Appl. No. 10/862,132, dated Apr. 28, 2009.
Office Action for U.S. Appl. No. 11/360,215, dated Apr. 28, 2009.
Office Action for U.S. Appl. No. 11/485,199, dated Apr. 28, 2009.
Office Action for U.S. Appl. No. 11/122,836 dated May 13, 2009.
Notice of Allowance and Notice of Allowability for U.S. Appl. No. 11/471,148.
Notice of Allowance and Notice of Allowability for U.S. Appl. No. 11/471,738, dated May 28, 2009.
Office Action mailed Nov. 18, 2008, for U.S. Appl. No. 11/122,836.
Office Action mailed Nov. 18, 2008, for U.S. Appl. No. 11/471,738.
Office Action mailed Nov. 17, 2008, for U.S. Appl. No. 11/471,148.
Office Action for U.S. Appl. No. 10/862,132 dated Dec. 30, 2009.
Office Action for U.S. Appl. No. 11/501,595 dated Feb. 5, 2010.
Office Action for U.S. Appl. No. 11/122,836 dated Feb. 22, 2010.
Office Action for U.S. Appl. No. 11/102,062 dated Feb. 24, 2010.
Office Action for U.S. Appl. No. 11/501,595 dated Aug. 17, 2009.
Office Action for U.S. Appl. No. 11/102,062 dated Nov. 12, 2009.
Office Action for U.S. Appl. No. 11/485,199 dated Nov. 18, 2009.
Office Action for U.S. Appl. No. 11/360,215, dated Dec. 7, 2009.
Office Action for U.S. Appl. No. 11/102,062 dated Jun. 29, 2010.
Office Action for U.S. Appl. No. 11/501,595 dated Jun. 29, 2010.
Office Action for U.S. Appl. No. 11/360,215 dated Jun. 9, 2010.
Office Action for U.S. Appl. No. 11/122,836 dated Jul. 22, 2010.
Notice of Allowance for U.S. Appl. No. 10/760,443 dated Feb. 8, 2010.
Notice of Allowance for U.S. Appl. No. 10/862,132 dated Apr. 1, 2010.
Office Action for U.S. Appl. No. 11/485,199 dated Sep. 8, 2010.
Office Action for U.S. Appl. No. 11/360,215 dated Sep. 8, 2010.
Office Action for U.S. Appl. No. 12/533,150 dated Jan. 7, 2011.
Office Action for U.S. Appl. No. 11/485,199 dated Feb. 8, 2011.
Office Action for U.S. Appl. No. 11/360,215 dated Feb. 8, 2011.
Office Action for U.S. Appl. No. 11/501,595 dated Feb. 8, 2011.
Office Action for U.S. Appl. No. 11/102,062 dated Nov. 18, 2010.
Office Action for U.S. Appl. No. 12/533,150 dated Jun. 10, 2011.
Office Action for U.S. Appl. No. 11/501,595 dated Jun. 27, 2011.
Office Action for U.S. Appl. No. 11/102,062 dated Mar. 23, 2011.
Office Action for U.S. Appl. No. 11/122,836 dated Apr. 29, 2011.

* cited by examiner

PERMEABILITY-MODIFYING DRILLING FLUIDS AND METHODS OF USE

CROSS-REFERENCE TO RELATED APPLICATIONS

This application is a continuation-in-part of U.S. application Ser. No. 10/760,443 entitled Methods and Compositions for Reducing the Production of Water and Stimulating Hydrocarbon Production from a Subterranean Formation, filed on Jan. 20, 2004 now U.S. Pat. No. 7,759,292.

BACKGROUND OF THE INVENTION

The present invention relates to subterranean drilling operations, and more particularly, the present invention relates to methods and compositions for reducing the permeability of a subterranean formation to aqueous-based fluids during the drilling phase.

The process of drilling a well bore in a subterranean formation typically requires the use of a drilling fluid. During the drilling process, the drilling fluid is passed down through the inside of the drill string, exits through the drill bit, and returns to the surface through the annulus between the drill string and the well bore. Among other things, the circulating drilling fluid lubricates the drill bit, carries drill cuttings to the surface, and balances the formation pressure exerted on the well bore. This process in the life of a well is known as the "drilling phase." It is understood that there is also a "production phase" in the life of a well, during which hydrocarbons or other desired substances may be produced.

While well bores usually are drilled in hydrocarbon-producing formations, the formations may contain layers of water or may be located adjacent to water-producing zones. The high mobility of water may allow it to flow into the well bore by way of natural fractures and/or high permeability streaks present in the formation. Over the life of such wells, the ratio of water to hydrocarbons recovered often becomes so high that the cost of producing the water, separating it from the hydrocarbons, and disposing of this water may represent a significant economic loss. Besides being highly undesirable during the production phase, water-producing zones may cause problems in the well bore with certain completions activities. However, these problems with the production of undesired water generally are not addressed during the drilling phase.

To reduce the production of undesired water from hydrocarbon-producing formations, aqueous polymer solutions that may contain cross-linking agents have been used. Such polymer solutions are injected into the formation and cross-linked to form stiff gels that may stop or reduce the flow of the undesired water. Even when a polymer solution is properly placed in a water-producing section, however, the cross-linked gels formed may not remain stable in the zone due to thermal degradation and/or differences in the adsorption characteristics of the polymer, associated cross-linker, and the like. Further, the selected placement of a polymer solution in a producing formation may require expensive, time-consuming mechanical zonal isolation. Zonal isolation also may be inaccurate, which may lead to plugging and/or damaging the hydrocarbon-bearing sections. Damage to hydrocarbon producing pathways is undesirable.

Recently, wells in the production phase have been treated with compounds to reduce the production of water with hydrocarbons. These compounds are commonly referred to as "relative permeability modifiers." Relative permeability modifiers, such as polyacrylamide, may be dissolved in water and pumped into a subterranean formation that produces water and hydrocarbons, reducing the permeability of the formation to water without substantially affecting the permeability therein to hydrocarbons. The use of these relative permeability modifiers, however, has resulted in only small temporary reductions in water production and/or unacceptable levels of reduction in hydrocarbon production. Further, conventional relative permeability modifiers heretofore have not been used in the drilling phase.

SUMMARY OF THE INVENTION

The present invention relates to subterranean drilling operations, and more particularly, the present invention relates to methods and compositions for reducing the permeability of a subterranean formation to aqueous-based fluids during the drilling phase.

Some embodiments of the present invention provide a method of reducing the permeability of a subterranean formation to aqueous-based fluids during the drilling phase that comprises the steps of providing a water-soluble relative permeability modifier that comprises a hydrophobically modified polymer; and placing the water-soluble relative permeability modifier into the subterranean formation during the drilling phase.

Another embodiment of the present invention provides a method of reducing the permeability of a subterranean formation to aqueous-based fluids during the drilling phase that comprise the steps of providing a water-soluble relative permeability modifier that comprises a hydrophilically modified polymer; and placing the water-soluble relative permeability modifier into the subterranean formation during the drilling phase.

Another embodiment of the present invention provides a method of reducing the permeability of a subterranean formation to aqueous-based fluids during the drilling phase that comprises the steps of providing a water-soluble relative permeability modifier that comprises a water-soluble polymer without hydrophobic or hydrophilic modification; and placing the water-soluble relative permeability modifier into the subterranean formation during the drilling phase.

Some embodiments of the present invention provide a method of drilling a well bore in a subterranean formation that comprises the steps of providing a drilling fluid that comprises a base fluid, and a water-soluble relative permeability modifier that comprises a hydrophobically modified polymer; and placing the drilling fluid in the well bore in the subterranean formation.

Another embodiment of the present invention provides a method of drilling a well bore in a subterranean formation that comprises the steps of providing a drilling fluid that comprises a base fluid, and a water-soluble relative permeability modifier that comprises a hydrophilically modified polymer; and placing the drilling fluid in the well bore in the subterranean formation.

Another embodiment of the present invention provides a method of drilling a well bore in a subterranean formation that comprises the steps of providing a drilling fluid that comprises a base fluid, and a water-soluble polymer without hydrophobic or hydrophilic modification; and placing the drilling fluid in the well bore in the subterranean formation.

Another embodiment of the present invention provides a drilling fluid that comprises a base fluid, and a water-soluble relative permeability modifier that comprises a hydrophobically modified polymer.

Yet another embodiment of the present invention provides a drilling fluid that comprises a base fluid, and a water-soluble relative permeability modifier that comprises a hydrophilically modified polymer.

The features and advantages of the present invention will be readily apparent to those skilled in the art upon a reading of the description of the exemplary embodiments which follows.

DESCRIPTION OF EXEMPLARY EMBODIMENTS

The present invention relates to subterranean drilling operations, and more particularly, the present invention relates to methods and compositions for reducing the permeability of a subterranean formation to aqueous-based fluids during the drilling phase.

In certain embodiments of the present invention, the water-soluble relative permeability modifiers comprise hydrophobically modified polymers. As used herein, "water-soluble" refers to at least 0.01 weight percent soluble in distilled water. As used herein, "hydrophobically modified" refers to the incorporation into the hydrophilic polymer structure of hydrophobic groups, wherein the alkyl chain length is from about 4 to about 22 carbons. In another embodiment of the present invention, the water-soluble relative permeability modifiers comprise hydrophilically modified polymers. As used herein, "hydrophilically modified" refers to the incorporation into the hydrophilic polymer structure of hydrophilic groups. In yet another embodiment of the present invention, the water-soluble relative permeability modifiers comprise water-soluble polymers without hydrophobic or hydrophilic modification.

The hydrophobically modified polymers that may be used in the present invention typically have a molecular weight in the range of from about 100,000 to about 10,000,000. In an exemplary embodiment, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

In certain embodiments of the present invention, the hydrophobically modified polymers may be a reaction product of a hydrophilic polymer and a hydrophobic compound. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophobic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide. In certain exemplary embodiments of the present invention, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, and starches. In an exemplary embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain exemplary embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In another embodiment of the present invention, the water-soluble relative permeability modifiers of the present invention comprise a hydrophilically modified polymer. The hydrophilically modified polymers used in the present invention typically have a molecular weight in the range of from about 100,000 to about 10,000,000. In an exemplary embodiment, the hydrophilically modified polymers comprise a polymer backbone that comprises polar heteroatoms. Generally, the polar heteroatoms present within the polymer backbone of the hydrophilically modified polymers include, but are not limited to, oxygen, nitrogen, sulfur, or phosphorous.

In certain embodiments of the present invention, the hydrophilically modified polymer may be a reaction product of a hydrophilic polymer and a hydrophilic compound. The hydrophilic polymers suitable for forming the hydrophilically modified polymers used in the present invention should be capable of reacting with hydrophilic compounds. In certain exemplary embodiments, suitable hydrophilic polymers include, homo-, co-, or terpolymers, such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophilic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide. In another exemplary embodiment, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, and starches. In an exemplary embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers comprising halogen; sulfonates; sulfates; and organic acid derivatives. Examples of suitable polyethers include, but are not limited to, polyethylene oxides, polypropylene oxides, polybutylene oxides, and mixtures thereof. In an exemplary embodiment, the polyether comprises an epichlorohydrin terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate with epichlorohydrin terminated polyethyleneoxide methyl ether; the reaction product of polydimethylaminopropyl methacrylamide with epichlorohydrin terminated polyethyleneoxide methyl ether; and the reaction product of poly(acrylamide/dimethylaminopropyl methacrylamide) with epichlorohydrin terminated polyethyleneoxide methyl ether. In an exemplary embodiment, the hydrophilically modified polymer comprises the reaction product of a polydimethylaminoethyl methacrylate with epichlorohydrin terminated polyethyleneoxide methyl ether having a weight ratio of polydimethylaminoethyl methacrylate to epichlorohydrin terminated polyethyleneoxide methyl ether of 3:1.

In another embodiment of the present invention, the water-soluble relative permeability modifiers comprise a water-soluble polymer without hydrophobic or hydrophilic modification. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide and quaternary salt derivatives of acrylic acid.

In certain embodiments of the present invention, the water-soluble relative permeability modifiers of the present invention may be placed into a subterranean formation during the drilling phase. As filtrate from the drilling fluids leaks off into the subterranean formation, it is believed that the water-soluble relative permeability modifier, among other things, may attach to surfaces within the subterranean formation. The presence of the water-soluble relative permeability modifiers in the subterranean formation may reduce the permeability of the treated zones of the subterranean formation to aqueous-based fluids (e.g., water) without substantially changing the permeability to hydrocarbons. This may reduce the subsequent problems associated with water flowing into the well bore from the subterranean formation.

In one embodiment of the present invention, the water-soluble relative permeability modifiers of the present invention may be placed into the subterranean formation in a drilling fluid that comprises the water-soluble relative permeability modifiers. The drilling fluids of the present invention generally comprise a base fluid and a water-soluble relative permeability modifier of the present invention. Moreover, other additives suitable for use in drilling fluids optionally may be added to the drilling fluids of the present invention as desired.

The base fluid utilized in the drilling fluids of the present invention may comprise aqueous-based fluids, oil-based fluids, or mixtures thereof. Where the base fluid is aqueous-based, the water utilized can be fresh water, salt water (e.g., water containing one or more salts dissolved therein), brine (e.g., saturated salt water), or seawater. Generally, the water may be from any source provided that it does not contain an excess of compounds that may adversely affect other components in the drilling fluid. Where the base fluid is oil-based, examples of suitable oils include, but are not limited to, mineral oils, synthetic oils, esters and the like. Generally, any oil that can be emulsified is suitable for use as a base fluid in the drilling fluids of the present invention. It should be understood that where oil-based drilling fluids are used in the present invention, such oil-based drilling fluids may comprise an emulsified aqueous phase that allows the modified water-soluble polymer to be incorporated into the oil-based drilling fluids.

The water-soluble relative permeability modifier generally should be present in the drilling fluids in an amount sufficient to provide the desired degree of permeability modification. In an exemplary embodiment, the water-soluble relative permeability modifier is present in the drilling fluids of the present invention in an amount in the range of from about 0.02% to about 10% by weight of the drilling fluid. In an exemplary embodiment, the water-soluble relative permeability modifier is present in the drilling fluids of the present invention in an amount in the range of from about 0.05% to about 1.0% by weight of the drilling fluid.

Additional additives may be added to the drilling fluids of the present invention as deemed appropriate by one skilled in the art for improving the performance of the drilling fluids with respect to one or more properties. Examples of such additives include, but are not limited to, emulsifiers, viscosifiers, fluid loss additives, salts, shale swelling inhibitors, weighting agents, and numerous other additives suitable for use in drilling operations.

While a number of exemplary embodiments described herein relate to drilling fluids, it is to be understood that the relative permeability modifiers of the present invention may be placed into the subterranean formation as part of other well bore fluids, used in the drilling phase, such as drill-in fluids and completion fluids.

Some embodiments of the present invention provide a method of reducing the permeability of a subterranean formation to aqueous-based fluids during the drilling phase that comprises the steps of providing a water-soluble relative permeability modifier that comprises a hydrophobically modified polymer; and placing the water-soluble relative permeability modifier into the subterranean formation during the drilling phase.

Another embodiment of the present invention provides a method of reducing the permeability of a subterranean formation to aqueous-based fluids during the drilling phase that comprises the steps of providing a water-soluble relative permeability modifier that comprises a hydrophilically modified polymer; and placing the water-soluble relative permeability modifier into the subterranean formation during the drilling phase.

Another embodiment of the present invention provides a method of reducing the permeability of a subterranean formation to aqueous-based fluids during the drilling phase that comprises the steps of providing a water-soluble relative permeability modifier that comprises a water-soluble polymer without hydrophobic or hydrophilic modification; and placing the water-soluble relative permeability modifier into the subterranean formation during the drilling phase.

Some embodiments of the present invention provide a method of drilling a well bore in a subterranean formation that comprises the steps of providing a drilling fluid that comprises a base fluid, and a water-soluble relative permeability modifier that comprises a hydrophobically modified polymer; and placing the drilling fluid in the well bore in the subterranean formation.

Another embodiment of the present invention provides a method of drilling a well bore in a subterranean formation that comprises the steps of providing a drilling fluid that comprises a base fluid, and a water-soluble relative permeability modifier that comprises a hydrophilically modified polymer; and placing the drilling fluid in the well bore in the subterranean formation.

Another embodiment of the present invention provides a method of drilling a well bore in a subterranean formation that comprises the steps of providing a drilling fluid that comprises a base fluid, and a water-soluble polymer without hydrophobic or hydrophilic modification; and placing the drilling fluid in the well bore in the subterranean formation.

Another embodiment of the present invention provides a drilling fluid that comprises a base fluid, and a water-soluble relative permeability modifier that comprises a hydrophobically modified polymer.

Yet another embodiment of the present invention provides a drilling fluid that comprises a base fluid, and a water-soluble relative permeability modifier that comprises a hydrophilically modified polymer.

To facilitate a better understanding of the present invention, the following examples of the preferred embodiments are given. In no way should the following examples be read to limit, or define, the scope of the invention.

EXAMPLES

Permeability reduction tests were performed using two treatment solutions and a multipressure tap Hassler sleeve containing a Berea sandstone core. These permeability reduction tests were performed at 175° F. Further, Test No. 1 was conducted using a brine containing 2% by weight potassium chloride, and Test No. 2 was conducted using a brine containing 7% potassium chloride. Two treatment solutions were prepared for this series of tests.

The treatment solution used in Test No. 1 comprised 5,000 ppm of a sample polymer and 500 ppm of "ARQUAD® DMCB 80" dissolved in 2% potassium chloride brine. "ARQUAD® DMCB 80" is a surfactant that is commercially available from Akzo Nobel Inc., Chicago, Ill. The sample polymer comprises a hydrophobically modified polymer that comprises a polymer backbone comprising polar heteroatoms formed from the reaction of a cationic starch and an organic acid derivative, such as octenyl acid or dodecenyl succinic acid.

The treatment solution used in Test No. 2 comprised 5,000 ppm of the sample polymer dissolved in 7% potassium chloride brine.

The following procedure was used for this series of tests, the results of which are provided in Table 1. For each test, the above-described brines were flowed through the Berea core, followed by oil (kerosene), followed by brine. This third brine flow was maintained until the pressure stabilized, yielding an initial brine permeability. Next, a treatment solution was flowed into the core. Next, the brine flow was reestablished until the pressure stabilized, yielding a final permeability from which the brine permeability was calculated using the formula [1-(final permeability/initial permeability)]×100. The multipressure tap Hassler sleeve allowed the core permeability to be divided into four segments. In the tests, the initial brine flow was from segment 1 to segment 4. The treatment solution flow was from segment 4 to segment 1, and the final brine flow was from segment 1 to segment 4. The results of the tests are provided below in Table 1.

TABLE 1

| Test | Sample Polymer Concentration (ppm) | Brine | Surfactant | Surfactant Concentration | Initial Water Permeability (milli Darcy) | Water Permeability Reduction |
|---|---|---|---|---|---|---|
| Test No. 1 | 5000 | 2% KCL | ARQUAD DMCB-80 | 500 ppm | 90 | 85% |
| Test No. 2 | 5000 | 7% KCL | None | None | 120 | 69% |

This example indicates, inter alia, that a water-soluble relative permeability modifier of the present invention may reduce the permeability of a subterranean formation to aqueous-based fluids.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the permeability of a subterranean formation to aqueous-based fluids during a drilling phase, the method comprising the steps of:
   providing a water-soluble relative permeability modifier that comprises a hydrophobically modified polymer, the hydrophobically modified polymer consisting of alkyl chains bound to a hydrophilic polymer, wherein the hydrophilic polymer consists of a polymer backbone that contains polar heteroatoms, at least one of which is not a nitrogen atom, and at least a portion of the polar heteroatoms are functionalized with the alkyl chains, wherein the hydrophilic polymer comprises at least one hydrophilic polymer selected from the group consisting of a cellulose, a chitosan, a polyetheramine, a polyhydroxyetheramine, a polylysine, a polysulfone, and a starch, and wherein the alkyl chains have a carbon chain length between about 4 and about 22 carbons, placing the water-soluble relative permeability modifier into the subterranean formation during the drilling phase, and allowing the water-soluble relative permeability modifier to attach onto a surface within the subterranean formation.

2. The method of claim 1 wherein the hydrophobically modified polymer has a molecular weight of from about 100,000 to about 10,000,000.

3. The method of claim 1 wherein the polar heteroatoms comprise at least one polar heteroatom selected from the group consisting of oxygen, nitrogen, sulfur, and phosphorous.

4. The method of claim 1 wherein the water-soluble relative permeability modifier is placed into the subterranean formation in a drilling fluid that comprises the water-soluble relative permeability modifier.

5. The method of claim 4 wherein the water-soluble relative permeability modifier is present in the drilling fluid in an amount in the range of from about 0.02% to about 3% by weight of the drilling fluid.

* * * * *